Patented Aug. 11, 1936

2,050,815

UNITED STATES PATENT OFFICE 2,050,815

PURIFICATION OF PHENYLPHENOLS

Wesley C. Stoesser, Midland, Mich., assignor to The Dow Chemical Company, Midland, Mich., a corporation of Michigan No Drawing. Application April 30, 1935, Serial No. 19,072

4 Claims. (Cl. 260—154)

The present invention relates to a method for purifying phenylphenols, e. g. orthophenylphenol and paraphenylphenol. It has particular regard to a method of purification such that metal salts, e. g. alkali metal salts, produced from the purified phenylphenols will be free from discoloration and will be stabilized against becoming discolored in storage.

In the commercial production of, for example, sodium salts of phenylphenols having the usual degree of purity, the salt as first produced has a white or slightly yellowish color. Upon standing for a few hours, however, such salt as heretofore made commences to become discolored and eventually changes to a brownish color even though the material has been protected from light and air. Such discoloration and lack of stability of the salts detracts from their quality, causes discoloration of other products in which they are incorporated, and makes them unsuitable for various uses in the arts.

It is an object of the present invention to provide a method of removing from phenylphenols the impurities which subsequently caused discoloration in the metal salts prepared therefrom. I have found that this object may be accomplished by treating the impure phenylphenol with an aqueous ferric chloride solution and then distilling the so treated phenylphenol whereby the distilled product possesses a higher degree of purity than has heretofore been available, and the salts prepared from such purified phenylphenols are stable against discoloration either in the process of preparation or subsequently in storage. The invention, then, consists in the method hereinafter fully described and particularly pointed out in the claims.

Although phenylphenols heretofore have been produced in highly pure form by the careful and repeated distillation of the crude material produced in the reaction for the formation of the phenylphenol, it has not been found possible to separate the last traces of impurities from the materials by distillation alone and the distilled product so obtained has not been suitable for preparing phenylphenates, i. e. salts of the phenylphenols, on account of the tendency already referred to of such salts to be discolored or subsequently to undergo discoloration.

In carrying out my invention the partially purified phenylphenol, such as heretofore has been the commercially produced material, is placed in a suitable vat or tank provided with a mechanical agitator and means for introducing live steam. To the phenylphenol in the tank is added a solution of ferric chloride which may have a concentration of from 4 to 40 per cent. It is preferable to start with a strong ferric chloride solution inasmuch as the solution becomes diluted in the subsequent treatment. The quantity of ferric chloride solution added is preferably about one-third by weight of the phenylphenol treated. The mixture is then heated to a temperature of from 60° to 100° C. by blowing in live steam and vigorously agitating for a period of time. Thereupon the mixture is allowed to separate into two layers, the upper layer being the purified phenylphenol in molten condition and the lower layer the ferric chloride solution. The two layers are then separated from each other by decantation. The phenylphenol layer is then washed by adding about one-half its weight of hot water and agitating for a short time at a temperature above its melting point, after which the phenylphenol layer is separated from the wash water. The phenyl-phenol layer is then neutralized by treating with a small amount of an alkali, e. g. by adding about 1 per cent by weight of solid sodium hydroxide and about 5 per cent by weight of water, and the whole thoroughly stirred together. Other alkalies such as potassium hydroxide, calcium hydroxide, sodium carbonate, etc., may be used. Following the treatment with alkali the phenylphenol is distilled in the usual manner and the distillate obtained is clear and colorless and of such degree of purity that metal salts prepared therefrom are likewise free from discoloration or from becoming discolored in storage.

In the following example the purification of orthophenylphenol is specifically described, but the method of the invention is equally applicable to the treatment of meta- or paraphenylphenol as well as to mixtures of the phenylphenols.

Example

In a wooden tank equipped with steam pipe and mechanical stirrer was placed 1680 pounds of commercially pure orthophenylphenol to which was added 1170 pounds of water and 520 pounds of a 38 per cent ferric chloride solution. The mixture was heated to a temperature above 60° C. and vigorously stirred for one hour. Thereupon the mixture was allowed to separate into two immiscible layers and the ferric chloride solution was drawn off. To the still molten orthophenylphenol was added 1,000 pounds of water and the temperature was raised to about 70° C. with constant stirring. The water and phenylphenol layers were then allowed to separate and the water layer removed, after which the phenylphenol was run into an iron tank, leaving behind in the wooden tank an emulsified layer of orthophenylphenol and water which was to be added to the next batch. To the molten phenylphenol was added a sodium hydroxide solution consisting of 17 pounds of sodium hydroxide and 85 pounds of water. The mixture was thoroughly agitated for about 15 minutes and then pumped to a still wherein the orthophenylphenol was distilled in the usual manner.

Sodium salts prepared from the so-purified orthophenylphenol were of a fine white color which was stable and permanent under conditions which caused the salts made from impure phenylphenols to turn brown within twenty-four hours. By the use of phenylphenols purified in accordance with this invention, the salts made therefrom impart no undesirable color to products prepared from them. When the usual sealed containers are employed, the salts can be shipped and stored for long periods without deteriorating.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of purifying phenylphenols, the step which consists in treating a liquefied phenylphenol with an aqueous ferric chloride solution prior to distilling the same.

2. In a method of purifying a phenylphenol the steps which consist in treating a liquefied phenylphenol with an aqueous ferric chloride solution, separating the aqueous solution from the phenylphenol and distilling the latter.

3. The method of purifying a phenylphenol which comprises adding an aqueous ferric chloride solution to the impure phenylphenol and thoroughly agitating the mixture at a temperature above the melting point of the phenylphenol, separating the aqueous solution from the phenylphenol, washing the latter with water, treating the same with a small amount of an alkali, and finally distilling.

4. The method of purifying orthophenylphenol which comprises thoroughly intermixing the same with an aqueous ferric chloride solution at a temperature above 60° C., separating the aqueous solution, washing the so-treated orthophenylphenol with water, treating with a small amount of an alkali, and finally distilling.

WESLEY C. STOESSER.